United States Patent
Yoon et al.

(10) Patent No.: US 11,598,705 B2
(45) Date of Patent: Mar. 7, 2023

(54) APPARATUS AND METHOD FOR MEASURING CREEP CRACK GROWTH PROPERTY USING SMALL SPECIMEN WITH MICRO GROOVE

(71) Applicant: CHUNGANG UNIVERSITY INDUSTRY-ACADEMIC COOPERATION FOUNDATION, Seoul (KR)

(72) Inventors: Kee Bong Yoon, Yongin-si (KR); Thanh Tuan Nguyen, Seoul (KR)

(73) Assignee: CHUNGANG UNIVERSITY INDUSTRY-ACADEMIC COOPERATION FOUNDATION, Seoul (KR)

( * ) Notice: Subject to any disclaimer, the term of this patent is extended or adjusted under 35 U.S.C. 154(b) by 556 days.

(21) Appl. No.: 16/614,157

(22) PCT Filed: May 22, 2017

(86) PCT No.: PCT/KR2017/005295
§ 371 (c)(1),
(2) Date: Nov. 15, 2019

(87) PCT Pub. No.: WO2018/212387
PCT Pub. Date: Nov. 22, 2018

(65) Prior Publication Data
US 2021/0063292 A1 Mar. 4, 2021

(30) Foreign Application Priority Data
May 19, 2017 (KR) .......................... 10-2017-0062471

(51) Int. Cl.
G01N 3/30 (2006.01)
G01N 1/28 (2006.01)
G01N 3/02 (2006.01)

(52) U.S. Cl.
CPC ................. *G01N 3/30* (2013.01); *G01N 1/28* (2013.01); *G01N 3/02* (2013.01)

(58) Field of Classification Search
CPC .............. G01N 3/08; G01N 3/30; G01N 3/42; G01N 2203/006; G01N 2203/0064; G01N 2203/0066; G01N 2203/0071
See application file for complete search history.

(56) References Cited

U.S. PATENT DOCUMENTS

| | | | |
|---|---|---|---|
| 6,332,364 B1 | 12/2001 | Buschmann et al. | |
| 6,810,748 B1 | 11/2004 | Nishida et al. | |
| 8,042,405 B2 * | 10/2011 | Shuaib | B21D 22/20 73/799 |

FOREIGN PATENT DOCUMENTS

| | | |
|---|---|---|
| JP | 2010-014600 A | 1/2010 |
| JP | 2014-077696 A | 5/2014 |
| KR | 10-2012-0010766 A | 2/2012 |

* cited by examiner

*Primary Examiner* — Erika J. Villaluna
(74) *Attorney, Agent, or Firm* — Novick, Kim & Lee PLLC; Jae Youn Kim (57) ABSTRACT

An apparatus and a method for measuring a creep crack growth property using a small specimen with a micro groove are provided. The apparatus for measuring a creep crack growth property includes a lower die on which an edge of the specimen is mounted and which includes a lower die hole formed in the center thereof, an upper die coupled to an upper portion of the lower die so as to fix the specimen, and a punching unit inserted into an upper die hole formed in the center of the upper die so as to press an upper surface of the specimen, wherein a semielliptical micro groove is formed in a lower surface of the specimen to measure a creep crack growth property.

12 Claims, 7 Drawing Sheets

APPARATUS AND METHOD FOR MEASURING CREEP CRACK GROWTH PROPERTY USING SMALL SPECIMEN WITH MICRO GROOVE

TECHNICAL FIELD

The present invention relates to an apparatus and a method for measuring a creep crack growth property, and more specifically, to an apparatus and a method for measuring a creep crack growth property using a small specimen with a micro groove.

BACKGROUND ART

Problems, such as creep damage and welding failure, are frequently caused in equipment and plants operated at high temperatures. Generally, when a crack is found in high-temperature equipment being used, a cracked portion is immediately removed by welding repair or replacement.

However, when the crack is formed in the equipment or accessibility is limited due to working conditions, it is difficult to repair the equipment by welding. In this case, the equipment with the crack has to be used in a site until the equipment is replaced. Therefore, accurate evaluation of a remaining crack growth lifetime of the equipment is absolutely necessary to evaluate safety of the equipment.

Evaluation of a creep property and creep crack growth behavior in equipment being operated in a plant is one of main concerns for safe operation and remaining lifetime evaluation of the equipment being operated at a high temperature and of an engineering structure. Most data are obtained by a standardized test, such as a uniaxial creep test or an existing creep crack growth test using a compact tension (CT) specimen, and the test requires a sufficient amount of material that cannot be extracted from the operated equipment.

In this case, when a specimen cannot be made by a sufficient amount of material, it is hard to test creep crack growth using a standard size specimen. Therefore, there is a need to develop a novel test to overcome limits of the existing creep crack growth test.

Technical Problem

The present invention is directed to providing an apparatus and a method for measuring a creep crack growth property using a small specimen with a micro groove, which measures a creep crack growth property using a small specimen in a local area such as a heat-affected part or a thin component of equipment and a structure in which evaluation of creep crack growth behavior is difficult.

Technical Solution

One aspect of the present invention provides an apparatus for measuring a creep crack growth property using a specimen small with a micro groove, the method includes a lower die on which an edge of the specimen is mounted and which includes a lower die hole formed in the center thereof, an upper die coupled to an upper portion of the lower die so as to fix the specimen, and a punching unit inserted into the upper die hole formed in the center of an upper die so as to press an upper surface of the specimen, wherein the micro groove is formed in a semielliptical shape in a lower surface of the specimen to measure a creep crack growth property.

The punching unit may include a punching ball which is inserted into the upper die hole and comes into contact with the upper surface of the specimen, and a punch which presses an upper portion of the punching ball.

The micro groove may be formed using a laser.

The micro groove of the specimen may be formed with a dimension determined by stress intensity factors calculated through the following Equation 1:

$$K = B(1+v)\frac{P}{\pi t^2}\left(\ln\frac{R}{r} + \frac{r^2}{4R^2}\right)\sqrt{a}\, F_{sp}\left(\frac{a}{c}, \frac{a}{t}, \phi\right) \quad \text{[Equation 1]}$$

$$B = \frac{3}{2}\sqrt{\frac{\pi}{1 + 1.464\left(\frac{a}{c}\right)^{1.65}}}$$

(K: stress intensity factor, v: Poisson's ratio, P: working load, t: specimen thickness, R: radius of lower die hole, r: radius of contact area of punching unit receiving specimen and working load, a: micro groove depth, c: half of micro groove width, Φ: angle of micro groove, $F_{sp}$: correction factor).

The correction factor $F_{sp}$ of the stress intensity factor may be calculated by the following Equation 2:

$$F_{sp}\left(\frac{a}{c}, \frac{a}{t}, \phi\right) = A_1 + A_2\left(\frac{a}{t}\right) + A_3\left(\frac{a}{t}\right)^2 \quad \text{[Equation 2]}$$

$$A_j = \sum_{i=0}^{2} B_{ij}(\sin\phi)^i,$$

j=1,2,3

($B_{ij}$: shape factor matrix according to specimen thickness)

The micro groove aspect ratio (a/c) of the stress intensity factor may be 0.5.

The micro groove depth ratio (a/t) of the stress intensity factor may be in a range of 0.1 to 0.3.

A fracture parameter controlling crack growth behavior of the micro groove of the specimen may be evaluated by the following Equation 3:

$$C_t = (C_t)_{ssc} + C^* \quad \text{[Equation 3]}$$

$$(C_t)_{ssc} = \frac{4\alpha\beta\tilde{r}_c(\theta, n)}{E(n+1)}(1-v^2)\frac{K^4}{W}\frac{F'}{F}(EA)^{\frac{2}{n-1}}T^{-\frac{n-3}{n-1}}$$

$$C^* = Aa\left(1-\frac{a}{t}\right)h_1\left(\frac{a}{t}, \frac{a}{c}, n\right)\left(\frac{P}{\eta_{sp}t^2}\right)^{n+1}$$

$$\left(\alpha = \frac{1}{2\pi}\left(\frac{(n+1)^2}{2n\alpha_n^{n+1}}\right)^{\frac{2}{n-1}},\right.$$

β: scale factor (0<β<1))
($\tilde{r}_c(\theta, n)$: non-dimensional function for n, E: Young's modulus, K: stress intensity factor, F: correction factor of K, F': derivative of F, n: crack constant, A: crack index, W, t: specimen thickness, v: Poisson's ratio, T: elapsed time, $h_1$: plasticity-correction function, $\eta_{sp}$: crack growth boundary condition function $$\left(\eta_{sp}\left(\frac{a}{c}, \frac{a}{t}, \phi\right)\right).$$

Another aspect of the present invention provides a method of measuring a creep crack growth property using a specimen small, the method includes forming a semielliptical micro groove in a surface of the specimen to grow a creep crack, and obtaining data for a creep crack growth property by applying a load on the specimen.

The micro groove of the specimen may be formed with a dimension determined by a stress intensity factor calculated through the following Equation 1:

$$K = B(1+v)\frac{P}{\pi t^2}\left(\ln\frac{R}{r} + \frac{r^2}{4R^2}\right)\sqrt{a}F_{sp}\left(\frac{a}{c}, \frac{a}{t}, \phi\right) \quad \text{[Equation 1]}$$

$$B = \frac{3}{2}\sqrt{\frac{\pi}{1+1.464\left(\frac{a}{c}\right)^{1.65}}}$$

(K: stress intensity factor, v: Poisson's ratio, P: working load, t: specimen thickness, R: radius of lower die hole, r: radius of contact area of punching unit receiving specimen and working load, a: micro groove depth, c: half of micro groove width, Φ: angle of micro groove, $F_{sp}$: correction factor).

The correction factor $F_{sp}$ of the stress intensity factor may be calculated by the following Equation 2:

$$F_{sp}\left(\frac{a}{c}, \frac{a}{t}, \phi\right) = A_1 + A_2\left(\frac{a}{t}\right) + A_3\left(\frac{a}{t}\right)^2 \quad \text{[Equation 2]}$$

$$A_j = \sum_{i=0}^{2} B_{ij}(\sin\phi)^i,$$

j=1,2,3

($B_{ij}$: shape factor matrix according to specimen thickness)

The micro groove aspect ratio (a/c) of the stress intensity factor may be 0.5.

The micro groove depth ratio (a/t) of the stress intensity factor may be in a range of 0.1 to 0.3.

A fracture parameter controlling crack growth behavior of the micro groove of the specimen may be evaluated by the following Equation 3:

$$C_t = (C_t)_{ssc} + C^* \quad \text{[Equation 3]}$$

$$(C_t)_{ssc} = \frac{4\alpha\beta\bar{r}_c(\theta, n)}{E(n+1)}(1-v^2)\frac{K^4}{W}\frac{F'}{F}(EA)^{-\frac{2}{n-1}}T^{-\frac{n-3}{n-1}}$$

$$C^* = Aa\left(1-\frac{a}{t}\right)h_1\left(\frac{a}{t}, \frac{a}{c}, n\right)\left(\frac{P}{\eta_{sp}t^2}\right)^{n+1}$$

$$\left(\alpha = \frac{1}{2\pi}\left(\frac{(n+1)^2}{2n\alpha_n^{n+1}}\right)^{\frac{2}{n-1}},\right.$$

β: scale factor (0<β<1))

($\bar{r}_c(\theta, n)$: non-dimensional function for n, E: Young's modulus, K: stress intensity factor, F: correction factor of K, F': derivative of F, n: crack constant, A: crack index, W, t: specimen thickness, v: Poisson's ratio, T: elapsed time, $h_1$: plasticity-correction function, $\eta_{sp}$: crack growth boundary condition function $$\left(\eta_{sp}\left(\frac{a}{c}, \frac{a}{t}, \phi\right)\right).$$

Advantageous Effect

According to an embodiment of the present invention, a creep crack grow property can be measured using a small specimen in a local area such as a heat-affected part or a thin component of equipment and a structure in which evaluation of creep crack growth behaviors is difficult.

Further, a creep crack growth property is measured using a small specimen made of a small amount of material, and thus test time and damage to a structure from which a specimen is collected can be reduced.

MODES OF THE INVENTION

Exemplary embodiments of the present invention will be illustrated in the drawings and described in detail in the written description, but the embodiments may be changed and have many alternative forms. However, the present invention is not limited to particular modes of practice, and it should be appreciated that all changes, equivalents, and substitutes not departing from the spirit and technical scope of embodiments are encompassed in the embodiments. In the description of the embodiments, certain detailed descriptions of a related art will be omitted when it is deemed that they unnecessarily obscure the essence of the inventive concept.

Although the terms first, second, etc. are used to describe various components, the components are not limited by the terms. The terms are used to only to distinguish one component from others.

The terminology used herein is for the purpose of describing particular embodiments only and is not intended to be limiting to the present invention. As used herein, the singular forms are intended to include the plural forms as well unless clearly indicated otherwise by context. It should be further understood that the terms "comprises" and/or "includes" specify the presence of stated features, integers, steps, operations, elements, and/or components when used herein, but do not preclude the presence or addition of one or more other features, integers, steps, operations, elements, components, and/or groups thereof.

Hereinafter, embodiments of an apparatus and a method for measuring a creep crack growth property using a small specimen with a micro groove according to the present invention will be described in detail with reference to the accompanying drawings. When describing the present invention with reference to the accompanying drawings, the same or similar elements are designated with the same numeral references, and redundant descriptions thereof will be omitted.

Figure 1:
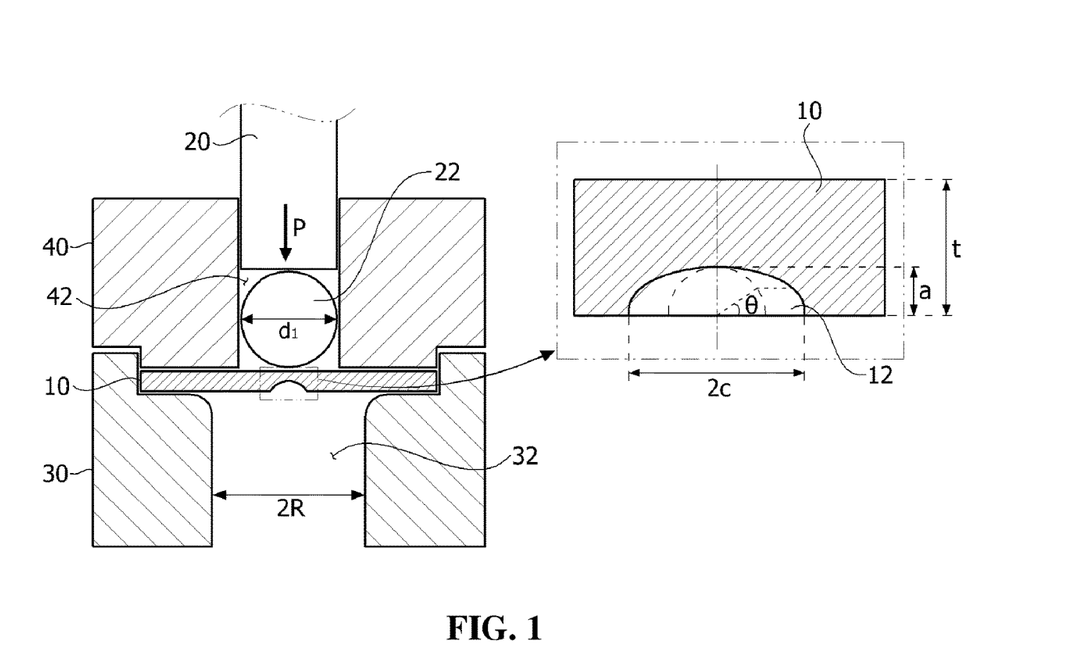
FIG. 1 is a cross-sectional view showing main parts of an apparatus for measuring a creep crack growth property according to one embodiment of the present invention.
Figure 2:
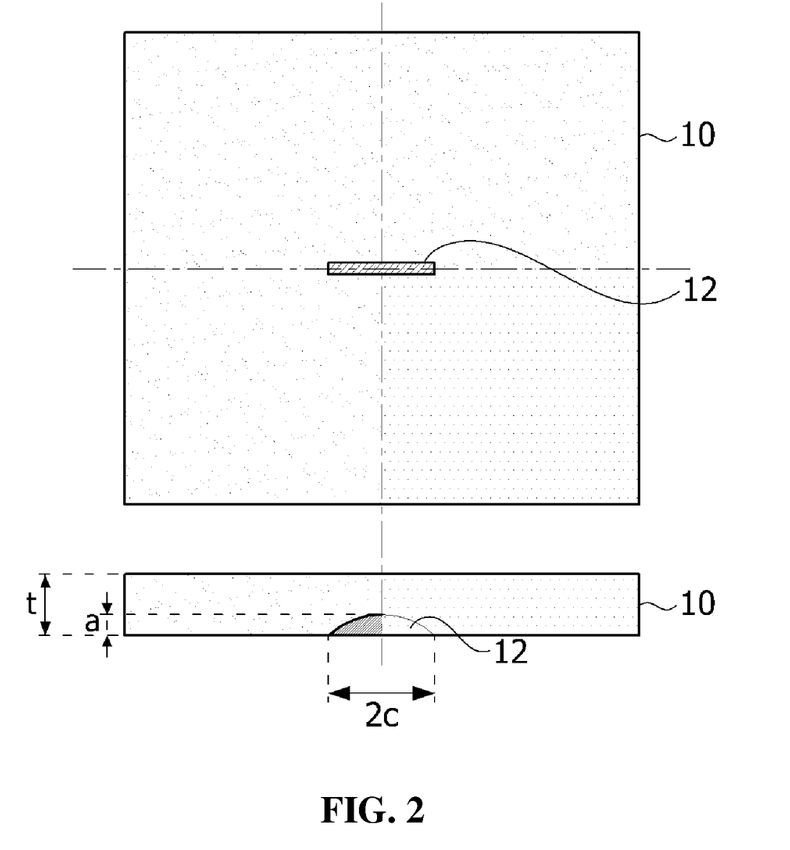
FIG. 2 is a view showing an example of a crack formed in a specimen.

FIG. 1 is a cross-sectional view showing main parts of an apparatus for measuring a creep crack growth property according to one embodiment of the present invention, and FIG. 2 is a view showing an example of a crack formed in a specimen.

As shown, an apparatus for measuring a creep crack growth property according to the embodiment of the present invention includes a lower die 30 on which an edge of a specimen 10 is mounted and which includes a lower die hole 32 formed in the center thereof; an upper die 40 coupled to an upper portion of the lower die 30 to fix the specimen 10; a punching ball 22 which is inserted into an upper die hole 42 formed in the center of the upper die 40 and comes into contact with an upper surface of the specimen 10; and a punch 20 pressing an upper portion of the punching ball 22, and a semielliptical micro groove 12 may be formed in a lower surface of the specimen 10 to measure a creep crack growth property.

Although a small punch tester (SP tester) is described as an example of the apparatus for measuring a creep crack growth property described in the embodiment of the present invention, any apparatus capable of testing a small specimen 10 may be used. The apparatus for measuring a creep crack growth property generally has a cylindrical shape. In this embodiment, a thin plate (10 mm×10 mm×0.5 mm) is used as the small specimen 10. Here, the small specimen 10 refers to a specimen which has a sufficiently thin thickness of less than or equal to 2 mm and has a parameter value that is constantly maintained over an entire end of the micro groove 12 when a semielliptical micro groove 12 is formed.

The lower die hole 32 formed in the center of the lower die 30 has space to be deformed when a sag of the specimen 10 pressed from the upper side is formed. That is, the specimen 10 sags downward from a part in which the micro groove 12 is formed while being in contact with the punching ball 22 by a working load of the punch 20. In this case, the sagging portion of the specimen 10 is positioned on the lower die hole 32 so that interference is not caused with the lower die 30.

Although detailed descriptions will be described below, the lower die hole 32 has a radius R. The radius R of the lower die hole 32 is used as a variable to determine a stress intensity factor K.

The lower die 30 allows an edge of the specimen 10 to be mounted thereon to function as a support, and as shown in FIG. 1, the upper die 40 is coupled to an upper portion of the lower die 30 to fix the specimen 10. That is, upper and lower surfaces of the edge of the specimen 10 adhere to the lower die 30 and the upper die 40, and thus the specimen 10 may be stably fixed to the lower die 30 and the upper die 40 during a testing process.

The upper die hole 42 is formed in the center of the upper die 40, and a diameter of the upper die hole 42 is relatively smaller than that of the lower die hole 32. A punch 20 and a punching ball 22 are disposed in the upper die hole 42 to apply a load on the specimen 10.

The punching ball 22 is positioned at a lower portion of the upper die hole 42, and the upper portion of the punching ball 22 is pressed by the punch 20. As the punching ball 22 is pressed by the punch 20 and comes in surface-contact with the upper surface of the specimen 10, occurrence of a creep crack growth of the specimen 10 may be developed. In this case, the crack growth refers to a behavior in which a crack formed while a load is applied by the punch 20 grows after the micro groove 12 is formed.

The micro groove 12 is formed in a surface of the specimen 10, that is, a lower surface, to measure a creep crack growth of the specimen 10. The micro groove 12, as shown in FIGS. 1 and 2, is formed in a lower surface of the specimen 10 using a laser or the like and may have a semielliptical shape. The micro groove 12 is not only formed by the above-described laser but may also be formed using any device as long as a condition to be described below is satisfied.

In the embodiment, the micro groove 12 formed in the specimen 10 is formed in a semielliptical shape to allow the micro groove 12 to grow from an end of a growth direction at a uniform speed as time passes while the micro groove has an initial shape. For example, when the micro groove 12 has a rectangular shape, the crack growth in the center of the micro groove 12 is different from the crack growth on both sides of the micro groove 12, and thus there is a problem in which the growth of the micro groove 12 cannot be uniformly recognized. Therefore, in the embodiment, the micro groove 12 has a semielliptical shape to uniformly grow in a radial direction.

Next, a suitable range of the shape of the micro groove 12 for testing the specimen 10 is determined based on an elastic finite element analysis. Hereinafter, the range of the parameter obtained based on the elastic finite element analysis will be described.

First, the stress intensity factor K is calculated by the following Equation 1. The stress intensity factor is a parameter representing risk or severity of stress state shown at a cracked portion when power is applied to an item. In other words, the stress intensity factor is a physical quantity showing strength of stress field at a front portion of the crack. When the same force is applied, as a length of the crack increases, K increases, and risk or severity of stress state by stress shown around the cracked portion thus increases. The stress intensity factor is obtained from a crack length and a tension-type applied stress value, and represents strength of stress field as physical quantity representing crack tip singularity.

$$K = B(1+v)\frac{P}{\pi t^2}\left(\ln\frac{R}{r} + \frac{r^2}{4R^2}\right)\sqrt{a}\,F_{sp}\left(\frac{a}{c}, \frac{a}{t}, \phi\right) \quad \text{[Equation 1]}$$

$$B = \frac{3}{2}\sqrt{\frac{\pi}{1+1.464\left(\frac{a}{c}\right)^{1.65}}}$$

(K: stress intensity factor, v: Poisson's ratio, P: working load, t: specimen thickness, R: radius of lower die hole, r: radius of contact area of punching unit (punching ball) receiving specimen and working load, a: micro groove depth, c: half of micro groove width, Φ: angle of micro groove, $F_{sp}$: correction factor).

The correction factor $F_{sp}$ of the stress intensity factor is calculated by the following Equation 2.

$$F_{sp}\left(\frac{a}{c}, \frac{a}{t}, \phi\right) = A_1 + A_2\left(\frac{a}{t}\right) + A_3\left(\frac{a}{t}\right)^2 \quad \text{[Equation 2]}$$

$$A_j = \sum_{i=0}^{2} B_{ij}(\sin\phi)^i,$$

j=1,2,3

($B_{ij}$: shape factor matrix according to specimen thickness)

Meanwhile, a fracture parameter $C_t$ is calculated by the following Equation 3.

$$C_t = (C_t)_{ssc} + C^* \quad \text{[Equation 3]}$$

$$(C_t)_{ssc} = \frac{4\alpha\beta\tilde{r}_c(\theta, n)}{E(n+1)}(1-v^2)\frac{K^4}{W}\frac{F'}{F}(EA)^{\frac{2}{n-1}}T^{-\frac{n-3}{n-1}}$$

$$C^* = Aa\left(1-\frac{a}{t}\right)h_1\left(\frac{a}{t},\frac{a}{c}, n\right)\left(\frac{P}{\eta_{sp}t^2}\right)^{n+1}$$

$$\left(\alpha = \frac{1}{2\pi}\left(\frac{(n+1)^2}{2n\alpha_n^{n+1}}\right)^{\frac{2}{n-1}},\right.$$

β: scale factor (0<β<1))

($\tilde{r}_c(\theta, n)$: non-dimensional function for n, E: Young's modulus, K: stress intensity factor, F: correction factor of K, F': derivative of F, n: crack constant, A: crack index, W, t: specimen thickness, v: Poisson's ratio, T: elapsed time, $h_1$: plasticity-correction function, $\eta_{sp}$: crack growth boundary condition function $$\left(\eta_{sp}\left(\frac{a}{c},\frac{a}{t},\phi\right)\right).$$

$(C_t)_{ssc}$ is a parameter for measuring a crack growth in small scale creep. In the small scale creep, crack growth takes a long time to take place and is long, and the small scale creep has a great influence on the crack growth. Further, C* is a parameter for measuring crack growth in extensive creep. Finally, Equation 3 shows the crack growth in both the small scale creep and extensive creep, which thus shows the entire creep.

Hereinafter, an actual test result for above-described parameter will be described with reference to FIGS. 3 to 7.

Figure 3:
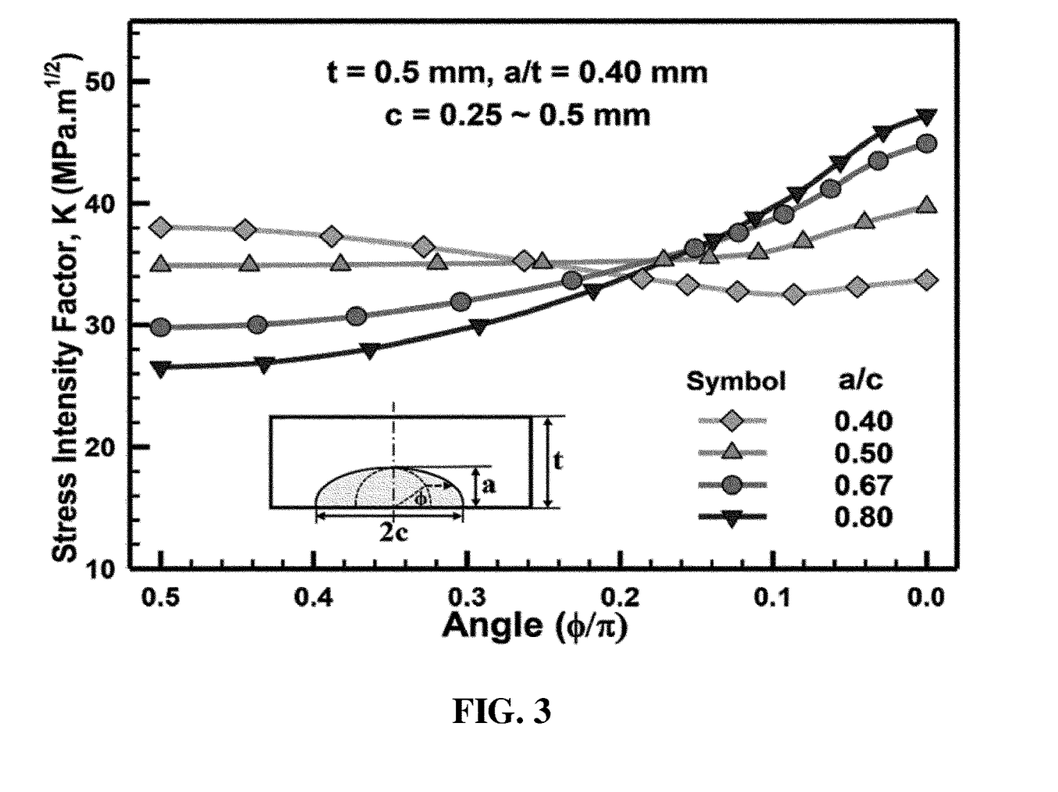
FIG. 3 is a graph showing stress intensity factors according to positions in cracks with various micro groove aspect ratios (a/c).
Figure 4:
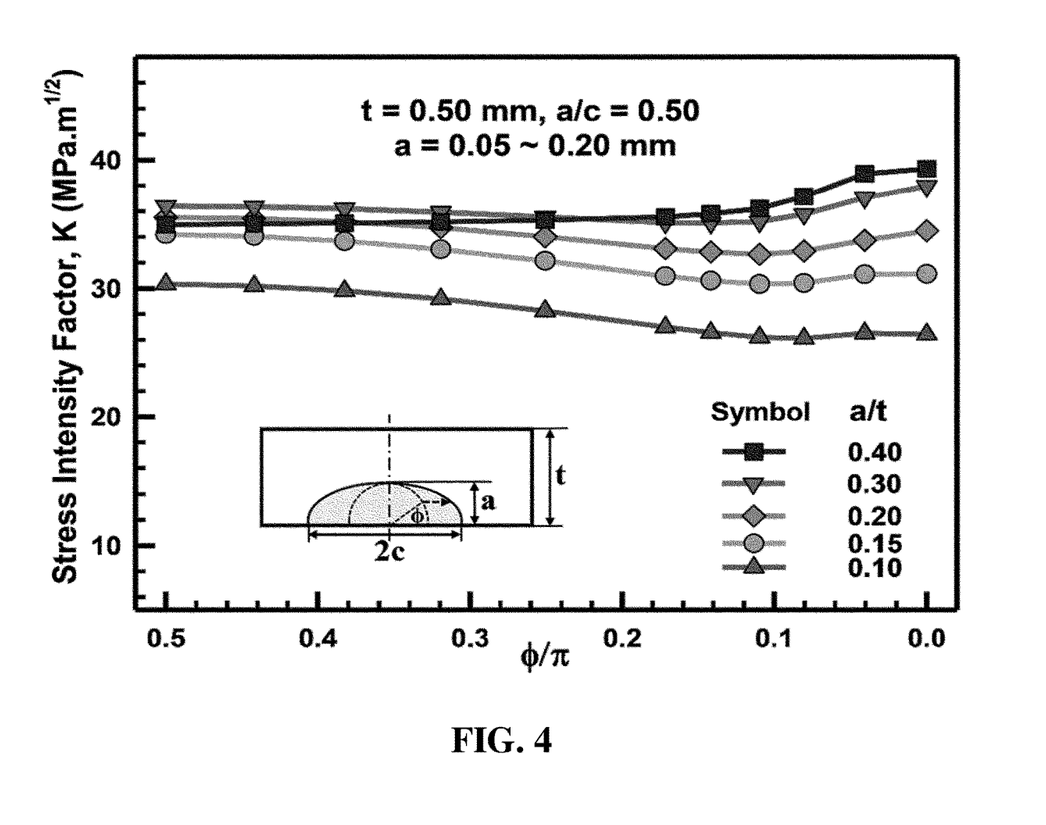
FIG. 4 is a graph showing stress intensity factors according to positions in cracks with various micro groove depth ratios (a/t).
Figure 5:
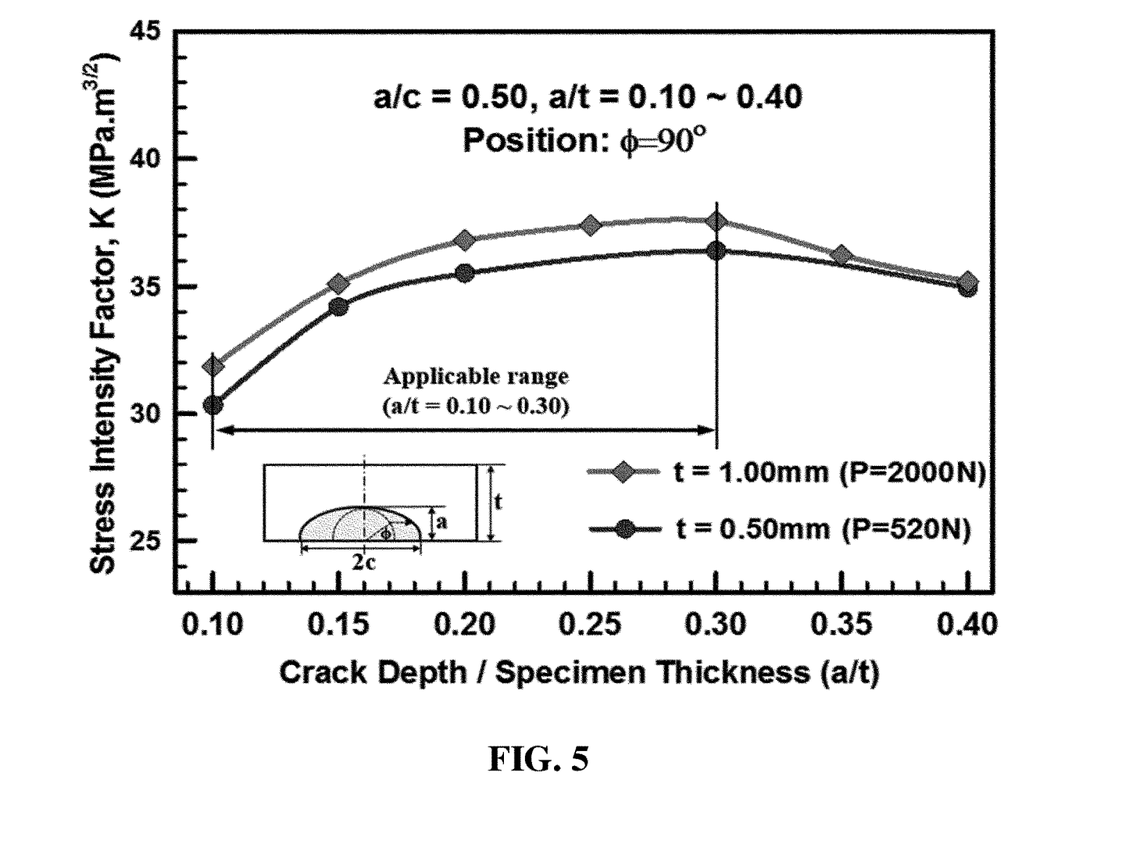
FIG. 5 is a graph showing stress intensity factors according to the micro groove depth ratios (a/t) in specimens with thicknesses of 0.5 and 1.0 mm.
Figure 6:
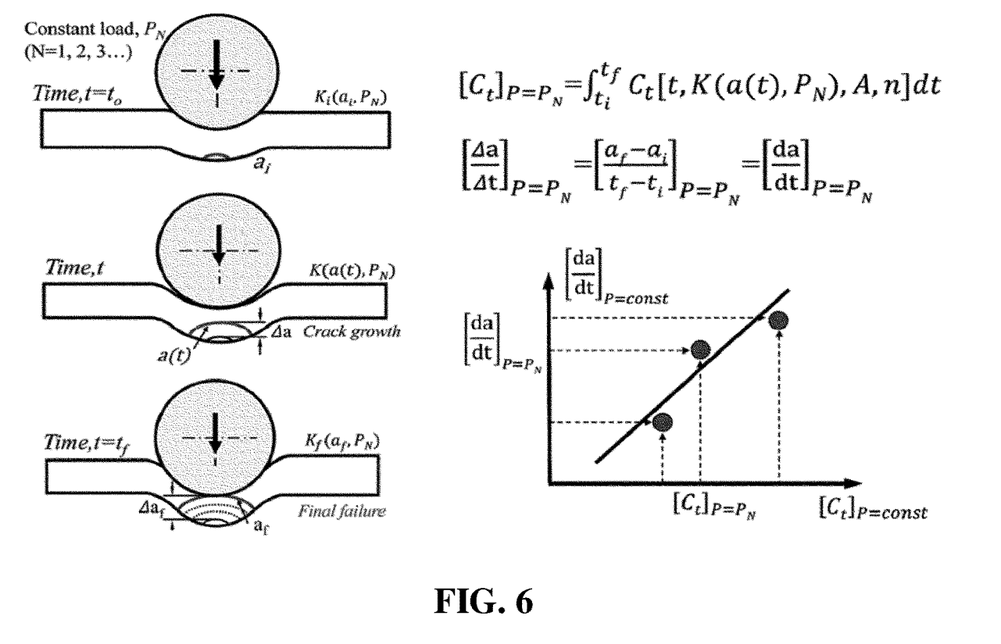
FIG. 6 is a view showing a method of evaluating a creep crack growth property.
Figure 7:
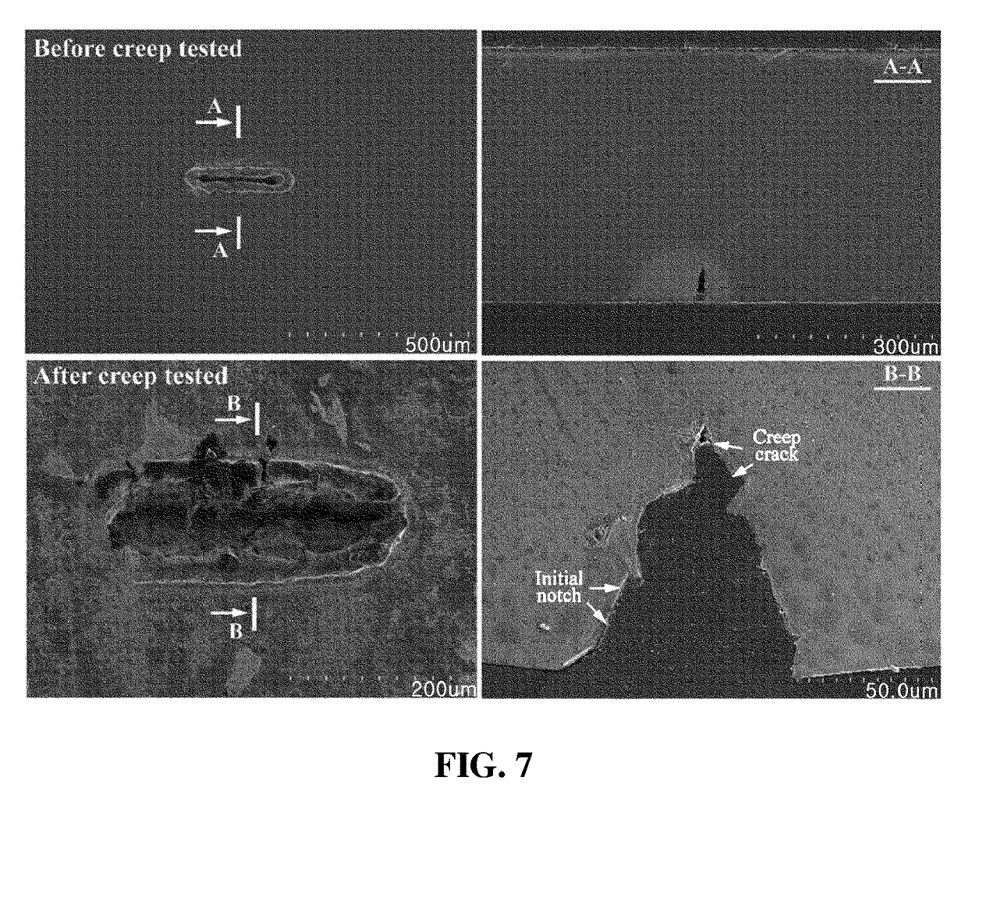
FIG. 7 is a view showing a directional nickel-based alloy to which the method in FIG. 6 is applied.

FIG. 3 is a graph showing stress intensity factors according to positions in a crack with various micro groove aspect ratios (a/c), FIG. 4 is a graph showing stress intensity factors according to positions in a crack with various micro groove depth ratios (a/t), FIG. 5 is a graph showing stress intensity factors according to the micro groove depth ratios (a/t) in specimens with thicknesses of 0.5 and 1.0 mm, FIG. 6 is a view showing a method of evaluating a creep crack growth property, and FIG. 7 is a view showing a directional nickel-based alloy to which the method in FIG. 6 is applied.

Referring to FIG. 3, the stress intensity factor K represents the most stable value according to a position change (angle change) in a crack when an aspect ratio (a/c) of micro groove is 0.50 except the closest position to a free surface. That is, when the aspect ratio (a/c) of micro groove is 0.40, 0.67, and 0.80, the stress intensity factor is changed according to a position change in a crack, but when the aspect ratio (a/c) is 0.50, the stress intensity factor is stable without a great change. It is most preferable that the initial micro groove 12 of the specimen 10 have an aspect ratio of 0.50 in the creep crack growth test using the specimen 10.

Referring to FIG. 4, when a ratio (a/t) of micro groove depth to the specimen 10 thickness is in a range of 0.10 to 0.30, as the micro groove depth ratio is increased, K is increased, but as the ratio (a/t) of micro groove depth to the specimen 10 thickness is greater than 0.30, K is decreased. Further, K is almost the same at most positions in the crack. When the semielliptical crack grows while maintaining an aspect ratio of 0.50, the crack growth test may be most efficiently performed when the micro groove depth ratio is increased from 0.10 to 0.30.

Referring to FIG. 5, the optimal range of the ratio (a/t) of micro groove depth to the specimen 10 thickness in the creep crack growth test using the specimen 10 in the embodiment of the present invention is in a range of 0.10 to 0.30. When a finite element analysis is performed under other conditions, K in the optimal range of the micro groove depth ratio is slightly increased, but similar tendencies are shown. When there is not much change in K value, the parameter $C_t$ is stably maintained during creep growth using the specimen 10, and thus a test error of a creep crack growth behavior test can be decreased.

Referring to FIGS. 6 and 7, the micro groove 12 is formed using a laser in the specimen 10 based on a crack parameter obtained by the finite element analysis. A method of testing creep crack growth according to the embodiment of the present invention includes stopping a test during growth of the micro groove 12 and measuring a final length of the crack using a scanning electron microscope (SEM) or a metal microscope. Therefore, the initial length of the crack and the final length of the crack obtained through the microscope and an average crack growth rate obtained by test time are characterized by average parameters expressed as K and $C_t$. Each test provides one point in a crack growth rate graph for the parameter $C_t$.

A specimen is formed using the above-described crack forming method, and the small punch creep test may be performed under various conditions at a static load. The creep crack growth rate may be evaluated through a metallurgical modified structure analysis, and a correlation function between a result obtained from the small punch test and a result obtained from an existing creep crack growth test may be derived. Therefore, the creep crack growth property can be directly measured under a condition of a heat-affected part of equipment or a structure or a thin component in which it is difficult to measure creep crack growth behavior through an existing test method.

While the present invention has been described with reference to the exemplary embodiments, it will be understood by those skilled in the art that various changes and modifications may be made without departing from the spirit and scope of the present invention as defined by the appended claims.

The invention claimed is:

1. An apparatus for measuring a creep crack growth property using a specimen having a micro groove, the apparatus comprising:
   a lower die on which an edge of the specimen is to be mounted, the lower die including a lower die hole formed in a center thereof;
   an upper die coupled to an upper portion of the lower die to fix the specimen; and a punching unit configured to be inserted into an upper die hole formed in a center of the upper die to press an upper surface of the specimen, the punching unit including a punching ball, wherein the micro groove is formed in a semielliptical shape only in a lower surface of the specimen to measure the creep crack growth property, wherein the micro groove of the specimen is formed with a dimension determined by a stress intensity factor, and wherein the stress intensity factor is obtained from a crack length and a stress value and represents strength of stress field as a physical quantity representing crack tip singularity.

2. The apparatus of claim 1, wherein the punching ball is configured to be inserted into the upper die hole to come into contact with the upper surface of the specimen, and wherein the punching unit further includes a punch configured to press an upper portion of the punching ball.

3. The apparatus of claim 1, wherein the micro groove is formed using a laser.

4. The apparatus of claim 1, wherein the the stress intensity factor is calculated through the following Equation 1:

$$K = B(1+v)\frac{P}{\pi t^2}\left(\ln\frac{R}{r} + \frac{r^2}{4R^2}\right)\sqrt{a}\,F_{sp}\left(\frac{a}{c}, \frac{a}{t}, \phi\right) \quad \text{[Equation 1]}$$

$$B = \frac{3}{2}\sqrt{\frac{\pi}{1 + 1.464\left(\frac{a}{c}\right)^{1.65}}}$$

(K: stress intensity factor, v: Poisson's ratio, P: working load, t: specimen thickness, R: radius of lower die hole, r: radius of contact area of punching unit receiving specimen and working load, a: micro groove depth, c: half of micro groove width, Φ: angle of micro groove, $F_{sp}$: correction factor), and wherein the correction factor $F_{sp}$ of the stress intensity factor is calculated by the following Equation 2:

$$F_{sp}\left(\frac{a}{c}, \frac{a}{t}, \phi\right) = A_1 + A_2\left(\frac{a}{t}\right) + A_3\left(\frac{a}{t}\right)^2 \quad \text{[Equation 2]}$$

$$A_j = \sum_{i=0}^{2} B_{ij}(\sin\phi)^i,$$

j=1,2,3

($B_{ij}$: shape factor matrix according to specimen thickness).

5. The apparatus of claim 4, wherein a micro groove aspect ratio (a/c) of the stress intensity factor is 0.5.

6. The apparatus of claim 4, wherein a micro groove depth ratio (a/t) of the stress intensity factor is in a range of 0.1 to 0.3.

7. The apparatus of claim 4, wherein a fracture parameter controlling crack growth behavior of the micro groove of the specimen is evaluated by the following Equation 3:

$$C_t = (C_t)_{ssc} + C^* \quad \text{[Equation 3]}$$

$$(C_t)_{ssc} = \frac{4\alpha\beta\tilde{r}_c(\theta,n)}{E(n+1)}(1-v^2)\frac{K^4}{W}\frac{F'}{F}(EA)^{\frac{2}{n-1}}T^{-\frac{n-3}{n-1}}$$

$$C^* = A a\left(1 - \frac{a}{t}\right)h_1\left(\frac{a}{t}, \frac{a}{c}, n\right)\left(\frac{P}{\eta_{sp}t^2}\right)^{n+1}$$

$$\left(\alpha = \frac{1}{2\pi}\left(\frac{(n+1)^2}{2n\alpha_n^{n+1}}\right)^{\frac{2}{n-1}},\right.$$

β: scale factor (0<β<1))

($\tilde{r}_c$ (θ, n): non-dimensional function for n, E: Young's modulus, K: stress intensity factor, F: correction factor of K, F': derivative of F, n: crack constant, A: crack index, W, t: specimen thickness, v: Poisson's ratio, T: elapsed time, $h_1$: plasticity-correction function, $\eta_{sp}$: crack growth boundary condition function $$\left.\left(\eta_{sp}\left(\frac{a}{c}, \frac{a}{t}, \phi\right)\right)\right).$$

8. A method of measuring a creep crack growth property using a specimen, the method comprising:

forming a micro groove in a semielliptical shape only in a lower surface of the specimen to grow a creep crack; and obtaining data for the creep crack growth property by applying a load on the specimen, wherein the micro groove of the specimen is formed with a dimension determined by a stress intensity factor, and wherein the stress intensity factor is obtained from a crack length and a stress value and represents strength of stress field as a physical quantity representing crack tip singularity.

9. The method of claim 8, wherein the stress intensity factor is calculated through the following Equation 1:

$$K = B(1+v)\frac{P}{\pi t^2}\left(\ln\frac{R}{r} + \frac{r^2}{4R^2}\right)\sqrt{a}\,F_{sp}\left(\frac{a}{c}, \frac{a}{t}, \phi\right) \quad \text{[Equation 1]}$$

$$B = \frac{3}{2}\sqrt{\frac{\pi}{1 + 1.464\left(\frac{a}{c}\right)^{1.65}}}$$

(K: stress intensity factor, v: Poisson's ratio, P: working load, t: specimen thickness, R: radius of lower die hole, r: radius of contact area of punching unit receiving specimen and working load, a: micro groove depth, c: half of micro groove width, Φ: angle of micro groove, $F_{sp}$: correction factor), and wherein the correction factor $F_{sp}$ of the stress intensity factor is calculated by the following Equation 2:

$$F_{sp}\left(\frac{a}{c}, \frac{a}{t}, \phi\right) = A_1 + A_2\left(\frac{a}{t}\right) + A_3\left(\frac{a}{t}\right)^2 \quad \text{[Equation 2]}$$

$$A_j = \sum_{i=0}^{2} B_{ij}(\sin\phi)^i,$$

j=1,2,3

($B_{ij}$: shape factor matrix according to specimen thickness).

10. The method of claim 9, wherein a micro groove aspect ratio (a/c) of the stress intensity factor is 0.5.

11. The method of claim 9, wherein a micro groove depth ratio (a/t) of the stress intensity factor is in a range of 0.1 to 0.3.

12. The method of claim 9, wherein a fracture parameter controlling crack growth behavior of the micro groove of the specimen is evaluated by the following Equation 3:

$$C_t = (C_t)_{ssc} + C^* \qquad \text{[Equation 3]}$$

$$(C_t)_{ssc} = \frac{4\alpha\beta\tilde{r}_c(\theta, n)}{E(n+1)}(1-v^2)\frac{K^4}{W}\frac{F'}{F}(EA)^{\frac{2}{n-1}}T^{-\frac{n-3}{n-1}}$$

$$C^* = Aa\left(1 - \frac{a}{t}\right)h_1\left(\frac{a}{t}, \frac{a}{c}, n\right)\left(\frac{P}{\eta_{sp}t^2}\right)^{n+1}$$

$$\left(\alpha = \frac{1}{2\pi}\left(\frac{(n+1)^2}{2n\alpha_n^{n+1}}\right)^{\frac{2}{n-1}},\right.$$

β: scale factor (0<β<1))
($\tilde{r}_c(\theta, n)$): non-dimensional function for n, E: Young's modulus, K: stress intensity factor, F: correction factor of K, F': derivative of F, n: crack constant, A: crack index, W, t: specimen thickness, v: Poisson's ratio, T: elapsed time, $h_1$: plasticity-correction function, $\eta_{sp}$: crack growth boundary condition function $$\left(\eta_{sp}\left(\frac{a}{c}, \frac{a}{t}, \phi\right)\right)).$$

\* \* \* \* \*